June 18, 1963
A. G. BAROWS ETAL
3,093,951
MULTIPLE KNIFE ASSEMBLY FOR FORAGE CHOPPERS
Filed Dec. 7, 1959
2 Sheets-Sheet 1
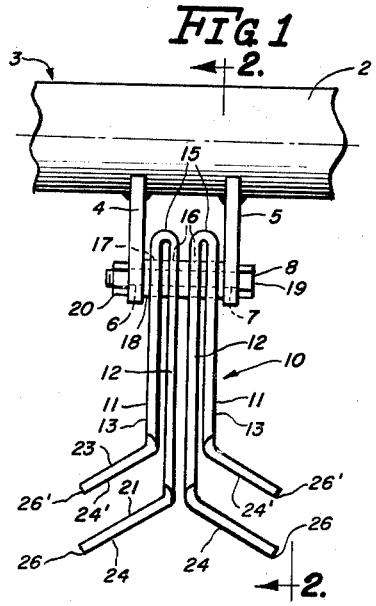
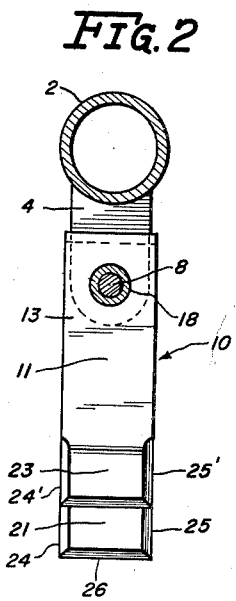
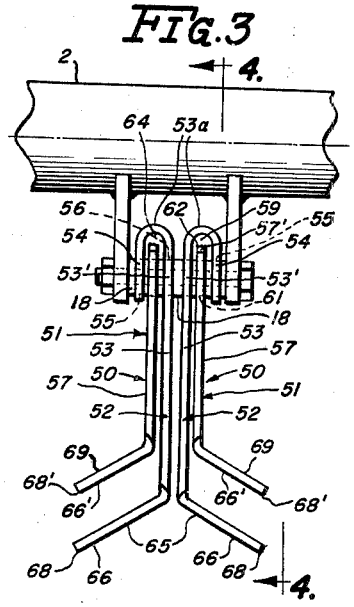
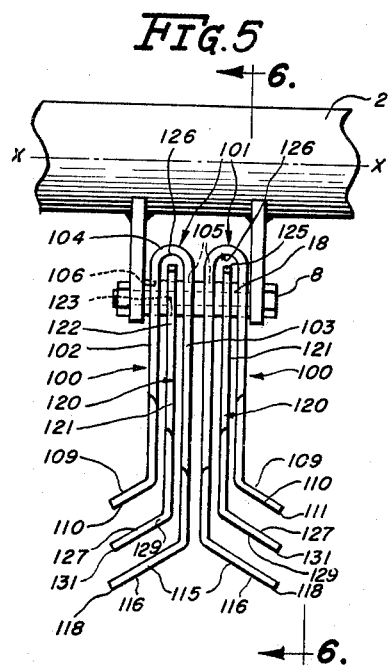
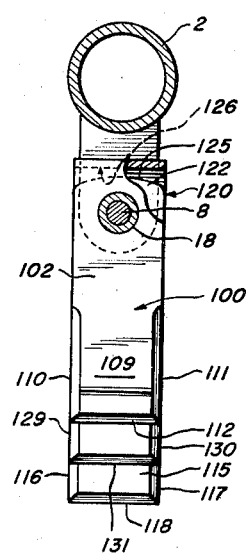
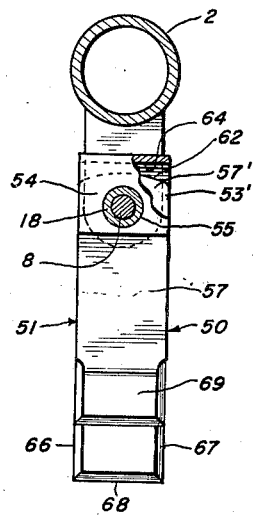
INVENTORS
Arthur G. Barows
Ronald F. Zitko
Paul O. Pippel
ATTORNEY June 18, 1963 A. G. BAROWS ETAL 3,093,951
MULTIPLE KNIFE ASSEMBLY FOR FORAGE CHOPPERS
Filed Dec. 7, 1959 2 Sheets-Sheet 2
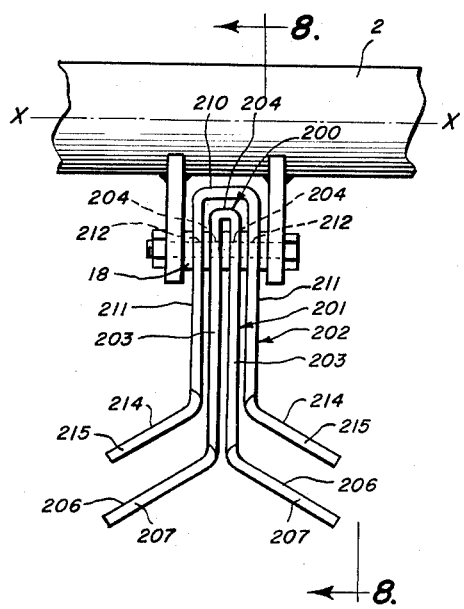
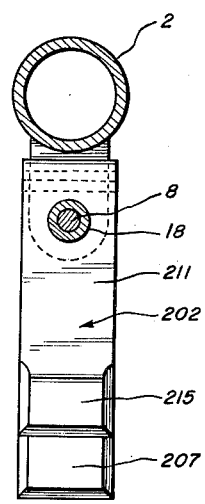
INVENTORS
Arthur G. Barows
Ronald F. Zitko
Paul O. Pippel
ATTORNEY

United States Patent Office 3,093,951
Patented June 18, 1963

3,093,951
MULTIPLE KNIFE ASSEMBLY FOR FORAGE CHOPPERS
Arthur G. Barows, Downers Grove, and Ronald F. Zitko, Cicero, Ill., assignors to International Harvester Company, Chicago, Ill., a corporation of New Jersey
Filed Dec. 7, 1959, Ser. No. 857,607
18 Claims. (Cl. 56—294)

This invention relates to forage choppers of a type which comprise a rotor with swinging knives or hammers which cut the crops directly in the field by impact action and more specifically to a novel knife arrangement for the rotor.

A general object of the invention is to provide a novel knife assembly for the rotor of the type previously described in which the knives are mounted in a novel arrangement to provide a plurality of shearing edges.

A more specific object of the invention is to provide a novel knife assembly which comprises a plurality of radially inwardly stepped knife edges in order to provide a plurality of shearing areas for chopping the material more finely than has heretofore been possible.

A still further object of the invention is to provide a novel knife assembly which is of compact structure and which provides a free-swinging action and a plurality of radially stepped shearing edges to obtain a fine chopping action.

These and other objects of the invention will become more apparent from the specifications and the drawings wherein:

FIGURE 1 is a front elevational view of a knife assembly shown mounted on a rotor shaft which is fragmentarily shown;

FIGURE 2 is a side elevational view of one of the knife members;

FIGURES 3 and 4 are views comparable to the showing of FIGURES 1 and 2 and illustrating a modification of the invention, FIGURE 3 being a front elevational view comparable to FIGURE 1;

FIGURE 4 is a side elevational view with a portion in section of the knife assembly of FIGURE 3;

FIGURES 5 and 6 illustrate a further embodiment, FIGURE 5 being a front elevation;

FIGURE 6 is a side elevation partly in section;

FIGURES 7 and 8 illustrate another embodiment, FIGURE 7 being a front elevational view; and FIGURE 8 being a side elevational view.

Description of FIGURES 1 and 2

Referring now to FIGURES 1 and 2 of the drawings there is shown a center shaft 2 of the rotor generally designated 3 of the type shown in U.S. Patent No. 2,758,435. The shaft 2 comprises holding means in the form of outwardly extending ears 4 and 5 which are apertured at their outer ends as at 6 and 7 for admitting a bolt 8 therethrough which provides an axis of pivot for a knife assembly generally designated 10 generally parallel to the axis of the center shaft 2 of the rotor. As best seen in FIGURE 1 the knife assembly 10 comprises a pair of mating knife structures 11, 11 which are of identical construction except that they are reversely arranged. Each knife assembly 11 comprises a hairpin type U-shaped shank portion which includes a pair of radially extending flat inner longer and outer shorter straplike legs 12 and 13 joined together at their inner ends by a bight portion 15 which forms a loop with the legs 12 and 13 and which fits in between the mounting means or lugs 4 and 5. The legs 12 and 13 are apertured as at 16 and 17 to admit the bolt 8 therethrough and the sleeve 18 which is mounted between the ears 4 and 5, the sleeve being held tightly between the ears 4 and 5 by the head 19 and nut 20 of the bolt 8 pursuant to tightening thereof as will be readily understood by those skilled in the art.

It will be seen that the leg 12 is longer than the leg 13 and spaced inwardly thereof and that the outer end of the leg 12 has an outer end portion 21 which forms the knife edge, the leg 21 extending axially of the rotor assembly at an angle of departure from the plane of the related shank portion 12 at an angle of between 5° and 90°. Similarly the outer end of the leg 13 is provided with a knife portion 23 which is angled generally parallel to the knife blade portion 21 and inasmuch as the leg 13 is substantially shorter than the leg 12, the blade portion 23 is stepped radially inwardly with respect to the blade portion 21. Each blade portion 21 and 23 is sharpened along all of its edges as at 24, 25 and 26 and 24', 25' and 26' respectively in order to provide sharp shearing edges along its forward lateral and rearward margins as will be readily seen from a consideration of FIGURE 2. On this basis after the edges 24 on one side of the blades are dulled or chipped the entire assembly may be removed and repositioned reversely that is by a 180° turnaround and then the other edges 24' and 25' will function the same as the original.

It will be seen that the knives 11, 11 swing independently of each other and that a mass of the two sections of each knife assembly is additive to resist swing back upon impacting against the crops.

Modification of FIGURES 3 and 4

Referring now to the embodiment shown in FIGURES 3 and 4 wherein parts which correspond to those of the previous embodiment are identified with corresponding reference numerals, the two knife assemblies 50, 50 are identical but reversely placed that is back to back and differ from the previous embodiment in that the radially shorter knife elements 51, 51 are separate and swing separately with respect to the longer knife elements 52, 52.

The longer knife elements each comprise a shank which has a flat strap portion 53 which is looped over at its inner end to provide a bight portion 53a which joins an auxiliary mounting lug 54 which generally parallels the shank portion 53 and extends substantially radially therewith and flatwise circumferentially, the lug 54 being apertured as at 55 and the shank portion being apertured as at 56 and admitting the sleeve 18 therethrough. Each knife member 51 which is shorter than the knife member 52 has a shank portion 57 which has its inner end 57' entered into the space 59 between the lug 54 and the inner end 53' of the shank 53 of the related knife 52, the inner end 57' being apertured as at 61 and admitting the sleeve or spacer 18 therethrough upon which the inner knife member is swingably mounted. It will be seen that the inner edge 62 of shank portion 51 is arcuate and has its curvature defined from the center radially outwardly of the aperture 61 whereby relative circumferential displacement between the inner and outer pair of knife members is restricted by abutment of the edge 62 with the inner side 64 of the bight portion 53a as best seen in FIGURE 4. This prevents the knives from interlocking with the circumferentially adjacent knife assemblies and severe impact against the crops causes the mass resistance of the entire knife assembly to resist the swing back. It will be seen that the outer extremity of each shank 53 is provided with a laterally outwardly angled blade portion 65 which has sharpened peripheral edges 66, 67 and 68, front and rear and lateral and that the angle of departure of the portion 65 is similar to that in the previous embodiment and that the portion 65 generally parallels the portion 69 which is on the outer end of the shank 57 of the shorter knife assembly 51. The knife assemblies 51, 51 flank the assemblies 52, 52. The portions 69 are also peripherally sharpened along their forward and rear edges as at 66', 67' and 68' and therefore the knife assemblies are all reversible as previously described in connection with the previous embodiment.

It will be realized that with providing the inner and outer cutting edges that the knife assemblies will shred the material into shorter lengths and a feature of the present invention is that present assemblies are accommodated in the space previously provided for by single knives of the type shown at 52 in FIGURE 3.

Modification of FIGURES 5 and 6

Referring now to the modification shown in FIGS. 5 and 6, wherein parts identical with those in the previous embodiments are identified by corresponding reference numerals, the knife assemblies 100, 100 are identical except that they are reversely arranged on the sleeve 18.

Each assembly 100 comprises a hairpin-shaped double knife structure generally indicated 101 which comprises outer and inner shank or strap portions 102 and 103, the shank portion 103 being longer than the shank portion 102 and extending radially outwardly therewith and providing flat sides generally circumferentially and at their inner ends are interconnected by a bight portion 104 and are apertured as at 105 and 106 by means of which the structure 101 is pivoted about the bolt 8 generally parallel to the axis X—X of the center shaft 2 of the rotor. The radially inner shank portion 102 is substantially shorter than the portion 103 and has an outer end portion 109 angled laterally outwardly at an angle of departure from the plane of the strap portion 102 from between 5 degrees and 90 degrees and has front, rear and laterally outward edges 110, 111 and 112, which are sharpened to provide cutting edges. It will be seen that the edges 110 and 111 extend along the outer ends of the shank portion 102. Similarly the outer end portion 115 of the strap or knife structure 103 is angled laterally outwardly generally parallel to the portion 109 at an angle of departure of between 5 degrees and 90 degrees and has sharpened front, rear and lateral edges 116, 117 and 118, the edges 116 and 117 extending along the outer ends of the strap 103. A knife member 120 is interposed between the shank portions 102 and 103 and has a flat shank portion 121 which generally parallels the portions 102 and 103 and has its inner end 122 apertured as at 123 and pivoted on the sleeve 18. The innermost edge 125 of the shank portion 121 is arcuate and curved from a center disposed radially outwardly of the center of the bolt 8 so that the edge 125 will limit through abutment with the inner side 126 of the bight portion 104 the swinging of the knife member 120.

The outer end 127 of the blade 120 is angled laterally outwardly generally parallel to the portions 109 and 115 at an angle of departure of 5° and 90° and has front, rear and lateral edges 129, 130 and 131 which are sharpened.

Thus it will be seen that in this embodiment there are six cutting edges present, as against the four in the previous embodiments.

Embodiment of FIGURES 7 and 8

Referring now to the embodiment shown in FIG. 7 wherein parts similar to those of the previous modifications are identified by corresponding reference numerals, the knife assembly generally designated 200 comprises a pair of radially and axially telescoped U-shaped knife structures 201 and 202. The knife structure 201 is disposed within the structure 202 and projects radially outwardly therefrom.

The assembly 201 includes a pair of flat strap-like shank elements 203 which are interconnected at their inner ends by a bight member 204, said shank portion 203 being apertured as at 204 and admitting the spacer 18 therethrough about which the knife assembly is pivoted on an axis generally parallel of the axis X—X of the center member 2. The outer extremities of the shank portion 203 diverge laterally or axially to provide end portions 206, 206 which have sharpened perimetrical edges 207 at their front, rear and lateral edges for cutting the material pursuant to rotation of the rotary assembly 2. The outer knife structure 202 has a bight portion 210 from which extend the legs or the flat strap shank portions 211 which are shorter than the portions 203, the portions 211 being apertured at their inner ends as at 212 through which the sleeve 18 extends and the outer extremities of the straps 211 are angled laterally or axially outwardly in diverging fashion to provide knife end portions 214, which are perimetrically sharpened as at 215 at their front, rear and lateral edges. It will be seen that the portions 214 are stepped radially inwardly of the portions 206 and are angled generally parallel with the portions 206 at an angle of departure between 5 degrees and 90 degrees from the plane of the related radially extending shank portions.

In each of these embodiments a multiple radially stepped sharpened edge arrangement is present for shredding the crops into small particles.

What is claimed is:

1. In a flail knife mower, a rotatable carrier, flail mounting means on the carrier, a flail assembly comprising a plurality of individual elements each pivotally mounted upon said mounting means and collectively presenting a plurality of radially stepped circumferentially directed cutting edges disposed in common radial planes.

2. The invention according to claim 1, and said cutting edges extending axially.

3. The invention according to claim 1 and said elements including a pair of shank portions lying in planes generally normal to the carrier axis and each having a cutter end portion turned outwardly from the face of the associated shank portion, and said cutting edges disposed on said end portions.

4. A cutter flail assembly for a rotary mower comprising a plurality of laterally spaced rigid shank elements having means at one end for pivotal mounting thereof on a common axis, said shank elements being progressively shorter laterally of the assembly, and each shank element having a cutter portion at its other end presenting a cutting edge, and said cutter portions over-lapping each other radially with respect to said axis and disposed at opposite sides of the assembly.

5. A cutter flail assembly according to claim 4 and at least one of the shank elements being individually pivotal about said axis.

6. The invention according to claim 5 and at least several others of said shank elements being rigidly interconnected to each other.

7. The invention according to claim 6 and at least several others of said shank elements being rigidly interconnected and providing abutment means engageable with the one element to limit swinging movement thereof.

8. In a flail knife mower, a rotatable carrier, flail mounting means thereon, a flail assembly comprising a plurality of cutter flails, means pivotally mounting said flails from said mounting means and spaced lengthwise of the carrier, each of said flails comprising a rigid strap-like body having a shank portion lying in a plane angularly disposed with respect to the carrier axis and pivotally connected at one end to the mounting means, said body having a cutter end portion turned outwardly from the related shank portion, the flails of each assembly having shank portions of progressively increasing length lengthwise of the carrier and said end portions offset radially with respect to each other and in radial alignment.

9. The invention according to claim 8 and said assembly comprising a pair of said shank portions interconnected at their one end by a bight portion, said means disposed between the bight portion and end portions.

10. The invention according to claim 8 and said assembly comprising a pair of said shank portions interconnected at their one end by a bight portion, said means extending through the shank portions, and another of said flails having its one end interposed between the pair and loosely swingable with respect thereto.

11. The invention according to claim 8 and said assembly comprising a pair of said shank portions interconnected at their one end by a bight portion, and another of said flails having its one end interposed between the pair and loosely swingable with respect thereto and having an inner edge spaced a limited distance with respect to the bight portion and abuttable therewith to limit free swinging movement between the same said means extruding through said shank portions.

12. In a flail knife mower, a rotatable carrier, flail mounting means thereon, a flail assembly comprising a plurality of cutter flails spaced lengthwise of the carrier, each of said flails comprising a rigid strap-like body having a shank portion lying in a plane angularly disposed with respect to the carrier axis and pivotally connected at one end to the mounting means, said body having a cutter end portion turned outwardly from the related shank portion, said assembly being bilaterally symmetrical and at each side of the center plane thereof the flails adjacent to the plane being longest and the flails remote from the plane being shortest and said assembly presenting a plurality of radially offset cutting edges at each side of the plane in substantial radial alignment with each other.

13. The invention according to claim 12 and said flails of the assembly each being independently pivotal with respect to each other.

14. The invention according to claim 12 and a bight portion connecting the flails close and remote with respect to said plane.

15. The invention according to claim 12 and a bight portion connecting the flails close and remote with respect to said plane and an intermediate flail between said close and remote flails loosely pivoted between the same.

16. A flail structure comprising a U-shaped body having a bight portion and a pair of strap-like generally parallel shank portions, one of the portions being longer than the other, said longer portion having a cutter end portion angled toward the shorter portion, and said shorter portion having a cutter end portion angled generally parallel to said other end portion on the longer shank portion.

17. The invention according to claim 16 and both of the cutter end portions extending in the same direction.

18. The invention according to claim 16 and said shank portions having means for the pivotal mounting thereof on a common axis.

References Cited in the file of this patent

UNITED STATES PATENTS

| | | |
|---|---|---|
| 1,870,932 | Sternemann | Aug. 9, 1932 |
| 2,529,358 | Slater | Nov. 7, 1950 |
| 2,711,067 | Mott | June 21, 1955 |
| 2,759,320 | Madden | Aug. 21, 1956 |
| 2,759,321 | Force | Aug. 21, 1956 |
| 2,836,023 | Caldwell | May 27, 1958 |
| 2,923,117 | Henderson | Feb. 2, 1960 |
| 2,969,820 | Gruendler | Jan. 31, 1961 |